United States Patent
Welch (10) Patent No.: US 7,942,954 B2
(45) Date of Patent: May 17, 2011

(54) METHOD AND APPARATUS FOR REFRESHING CARBON IN A CARBON FILTER CANISTER

(76) Inventor: Nathaniel E. Welch, Beaumont, TX (US)

(*) Notice: Subject to any disclaimer, the term of this patent is extended or adjusted under 35 U.S.C. 154(b) by 260 days.

(21) Appl. No.: 12/287,985

(22) Filed: Oct. 15, 2008

(65) Prior Publication Data
US 2009/0145298 A1 Jun. 11, 2009

Related U.S. Application Data

(60) Provisional application No. 60/999,087, filed on Oct. 16, 2007.

(51) Int. Cl.
*B01D 53/04* (2006.01)
(52) U.S. Cl. .......................................... 96/151
(58) Field of Classification Search .............. 96/147, 96/150, 151; 95/90, 109, 110
See application file for complete search history.

(56) References Cited

U.S. PATENT DOCUMENTS

| | | | | | |
|---|---|---|---|---|---|
| 2,080,578 | A | * | 5/1937 | Ray | 96/130 |
| 2,127,645 | A | * | 8/1938 | Kinney et al. | 55/479 |
| 3,330,096 | A | * | 7/1967 | Zimmerley | 95/110 |
| 3,795,090 | A | * | 3/1974 | Barnebey | 96/150 |
| 4,231,768 | A | * | 11/1980 | Seibert et al. | 96/128 |
| 4,255,166 | A | * | 3/1981 | Gernand et al. | 95/27 |
| 4,354,862 | A | * | 10/1982 | Sgaslik | 55/296 |
| 4,544,384 | A | * | 10/1985 | Metschl et al. | 96/130 |
| 4,698,072 | A | * | 10/1987 | Rohde et al. | 95/119 |
| 4,963,166 | A | * | 10/1990 | Hoyt et al. | 96/132 |
| 4,983,190 | A | * | 1/1991 | Verrando et al. | 95/11 |
| 4,986,836 | A | | 1/1991 | Tandon | |
| 5,192,431 | A | * | 3/1993 | Holmes | 210/198.1 |
| 5,198,004 | A | * | 3/1993 | Vollhardt | 96/124 |
| 5,520,571 | A | | 5/1996 | Brown et al. | |
| 6,152,992 | A | * | 11/2000 | Gemmingen | 95/96 |
| 6,162,282 | A | | 12/2000 | Walters et al. | |
| 6,296,815 | B1 | * | 10/2001 | Walker et al. | 422/199 |
| 7,157,001 | B2 | | 1/2007 | Christeson | |

OTHER PUBLICATIONS

TIGG Corporation, web pages re: Remediation Products, www.tigg.com/remediation_products/standard_products/, printout dated Jan. 18, 2007.

Westates Carbon, Inc., Aqua Scrub Product Description Sheet (2 pages), date prior to Jan. 18, 2007.

* cited by examiner

*Primary Examiner* — Frank M Lawrence
(74) *Attorney, Agent, or Firm* — Shaper Iler LLP; Sue Z. Shaper (57) ABSTRACT

Method and apparatus for refreshing carbon in a carbon filter system, preferably involving a plurality of canisters, wherein spent carbon is dumped from a filtering canister into a spent carbon container.

14 Claims, 11 Drawing Sheets

METHOD AND APPARATUS FOR REFRESHING CARBON IN A CARBON FILTER CANISTER

CROSS REFERENCE TO RELATED APPLICATIONS

This application claims priority to U.S. provisional application No. 60/999,087, filed Oct. 16, 2007, of the same title and inventorship, eg: Method and Apparatus for Refreshing Carbon in an Industrial Carbon Filter System by inventor Nathaniel E. Welch.

FIELD OF THE INVENTION

The invention lies in the field of method and apparatus for refreshing carbon in an industrial carbon filter system, and more particularly, the invention relates to a novel carbon filter canister and a novel method for refreshing carbon in canisters.

BACKGROUND OF THE INVENTION

Present apparatus and methods for changing out carbon in an industrial carbon filter system, such as in a chemical process plant, include 50 to 2000 pound carbon canisters having openings at the top for receiving fresh carbon. Releasable attachment parts affixed to the canisters, such as nipples and flanges, are provided for connecting the canister into a process stream line for filtering the stream. A stream inlet nipple is usually provided near the top of the canister and a stream outlet nipple near the bottom.

The plant typically provides a roll-off box or the like for collecting spent carbon and sending it off to be revitalized and then re-used. The plant also usually provides a fork lift for moving canisters around the site. Typically a service provider is retained by the plant, however, to change out spent carbon and to refill the canisters with fresh carbon, upon demand and need. Spent carbon is shipped off-site to be revitalized. This spent carbon may be wet or dry.

Current service provider systems and methods typically include a truck, manned by at least two people, the truck having a hopper and vacuum apparatus. At least two people are required to set up the hopper and run the vacuum operation. In operation, in the prior art, canisters with spent carbon filter material are disconnected from their process streams and brought to a central site, usually proximate the location of a roll-off box or the like at a plant facility. A service provider vacuum truck is driven to the site. The at least two service people set up the hopper as the well as the vacuuming equipment. The upper lid of the canisters are opened, each in turn, and spent carbon is vacuumed out from the canister and into the provider's hopper. When the hopper is filled, (a hopper typically holds about 1500 pounds of spent carbon,) vacuuming is stopped and the hopper is frequently moved by the fork lift to a roll-off box, dumped into the roll-off box and returned to the proximity of the truck for further vacuuming. In a less favored system, because it entails higher risks, the hopper dumps its contents into one or more spent carbon container bags at the canister site. The bags are then tied off and moved to a location for collecting and shipping off site. (The possibility of the deterioration of the bags and resulting contamination of the site prior to shipping causes this option to be slightly less favored.)

The instant invention comprises an improvement to these known prior art systems and methods. The instant invention, at least in certain key applications, has been tested to determine that it is more cost effective and requires less equipment and fewer people and takes less time.

In preferred key embodiments of the instant invention, a canister is provided with two valved orifices. While one orifice may always be provided on top of the canister for re-filling the canister with fresh carbon, preferably a second valved orifice is provided by the instant invention on lower parts of the canister or on the bottom. This second orifice is preferably situated on the bottom and preferably includes a ball valve or the like for controlling an approximately four to six inch diameter opening. The same roll-off box and forklift provided by the plant, as discussed above, can be used in the instant invention. As will be shown, however, the instant invention can also be utilized with existing canisters.

In key preferred embodiments of the instant invention, a truck arrives with one person to the site of the canisters. (The truck may include vibration equipment for difficult canisters.) In this preferred embodiment one person lifts, with the fork lift, each canister up and over the top of the plant's roll-off box or the like. (Alternate embodiments are also disclosed below.) The service person opens a lower orifice on the bottom of the canister using a ball valve, and the spent carbon drops by gravity into the roll-off box. Alternately, the service person might pivot the canister, to invert it over the roll-off box, such that the spent carbon dumps from the top orifice.

The instant inventor's tests indicate that while it takes two people 8-9 minutes to vacuum a thousand pounds of spent carbon from a canister, it only takes one person two minutes or less to dump a thousand pounds of spent carbon into a roll-off box. (Note: the canister could also be dumped into saturated carbon containers or bags instead of a roll-off box. Again, use of such bags is slightly disfavored, as mentioned above, for incurring higher potential contamination hazards.)

The instant invention eliminates the need for vacuuming equipment, for the second or more service person and for the intermediate step of filling and emptying the service provider's hopper.

In the odd situation when spent carbon might resist dropping out of a canister by gravity, tests have indicated that the techniques of shaking, scraping and/or vibration can be successfully employed. The inventor's tests have demonstrated that a forklift can affectively shake a canister to cause sections of spent wet carbon that failed to fall by gravity, to break off and fall out of a canister. The inside walls of a canister can also be scraped, or squeegeed, by the service person. In addition, a vibrator, such as a vibrator used with a cement mixer, can be connected or inserted in the canister, possibly with a hand held prong inserted inside of the canister, to help ensure that all spent carbon is dislodged.

Again, preferred novel canisters of key embodiments of the instant invention have a second bottom valved orifice, which opens and closes. Although these canisters should be more expensive than the canisters of the prior art, that cost should be more than recovered by the enhanced speed and lessened cost of dumping rather than vacuuming, and also by the reduced cost of manpower and equipment.

SUMMARY OF THE INVENTION

The invention includes methods for refreshing carbon in an industrial-scale carbon filter system. Carbon filtering typically includes connecting a process stream line to an inlet and outlet of a canister, for the purpose of filtering the process stream. When the carbon in a canister is spent, the canister is disconnected from the process stream line. Preferred embodiments of the instant invention disclose dumping the spent carbon from a 50 lb to 2000 lb canister by force of gravity into a container, preferably a roll-off box or bag. In preferred embodiments of the instant invention the canister may have two openings, each valved, one at the top of the canister and one at the bottom of the canister. Subsequently fresh carbon may be added to the canister and the canister placed back on line.

The invention involves a method for refreshing carbon and a vessel of the carbon filter system where the vessel has a process stream line connected to a process inlet and a process stream outlet for filtering the stream until the carbon is spent. The method includes using a 50 pound to 500 pound canister vessel having at least one valve opening and dumping the spent carbon through the at least one valved opening by force of gravity into a spent carbon container. Preferably the vessel has two valved openings, one at the top and one at the bottom. The opening at the top is preferably used for refreshing the carbon while the opening at the bottom is preferably used for dumping spent carbon. The method can include lifting the vessel for dumping the carbon above the spent carbon container. The lifting can include lifting equipment mating with channels on the vessel. The method can include shaking, vibrating and scraping the vessel to ensure removal of all spent carbon. Preferably the invention includes a carbon filter canister vessel structured to hold 50 to 1000 pounds of carbon filter material having an inlet and outlet for placing the vessel in fluid communication with the process stream to be filtered and having an upper orifice capable of opening and closing for adding fresh carbon as well as a lower orifice capable of opening and closing for dumping spent carbon filter material. The vessel may have a frame element structured for pivoting the vessel to invert the vessel.

BRIEF DESCRIPTION OF THE DRAWINGS

A better understanding of the present invention can be obtained when the following detailed description of the preferred embodiments are considered in conjunction with the following drawings, in which.

The drawings are primarily illustrative. It would be understood that structure may have been simplified and details omitted in order to convey certain aspects of the invention. Scale may be sacrificed to clarity.

DESCRIPTION OF THE PREFERRED EMBODIMENTS

Figure 1A:
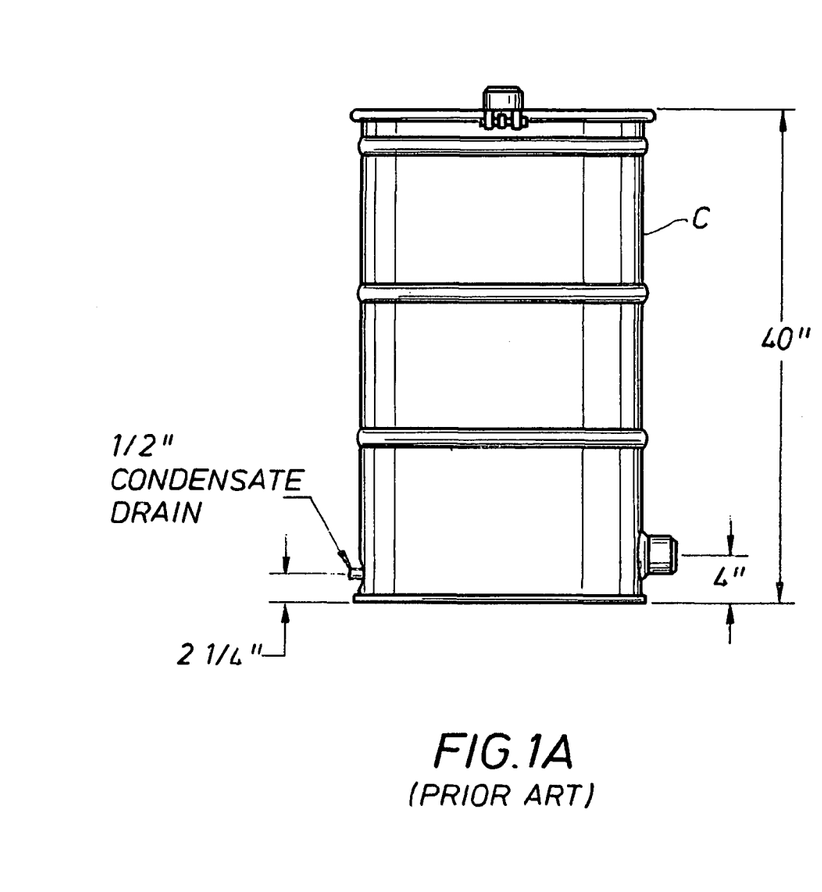
FIGS. 1A-D document and illustrate prior art systems and methods for refreshing carbon in a carbon filter system.
Figure 1B:
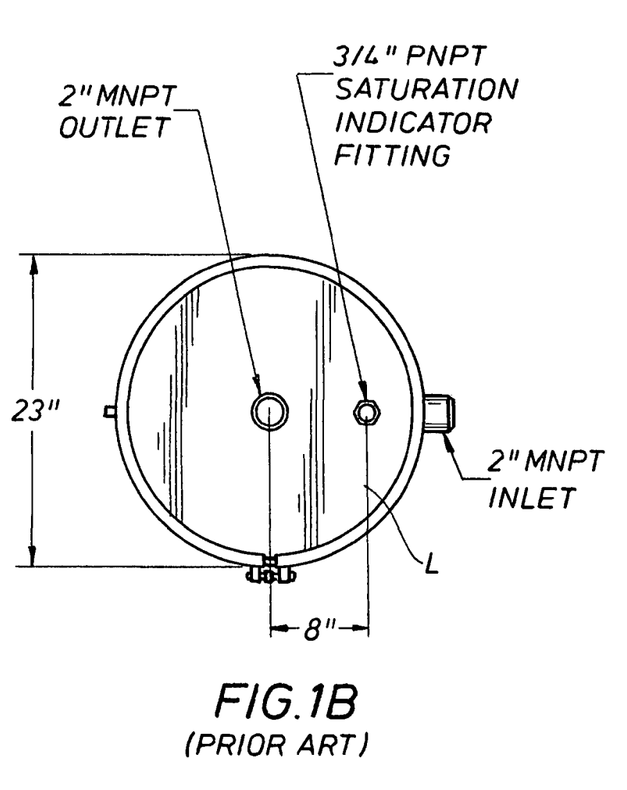
Figure 1C:
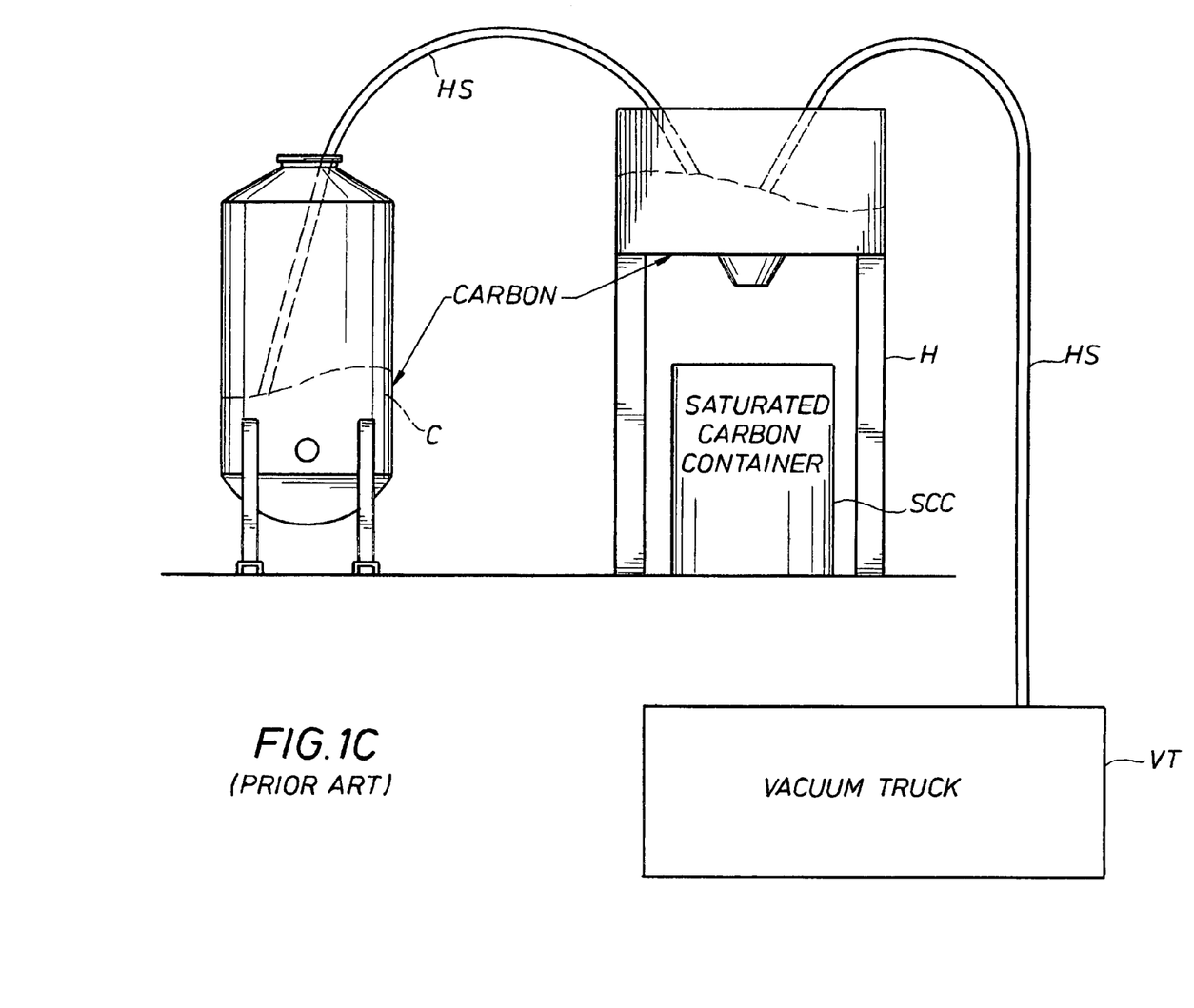

FIGS. 1A-D relate to the prior art. FIGS. 1A and 1B illustrate a side and top view of a prior art canister C having a lid L. FIGS. 1C and D illustrate the prior art method of vacuuming carbon from a canister C into a hopper H utilizing vacuum equipment on vacuum truck VT.

Figure 1D:
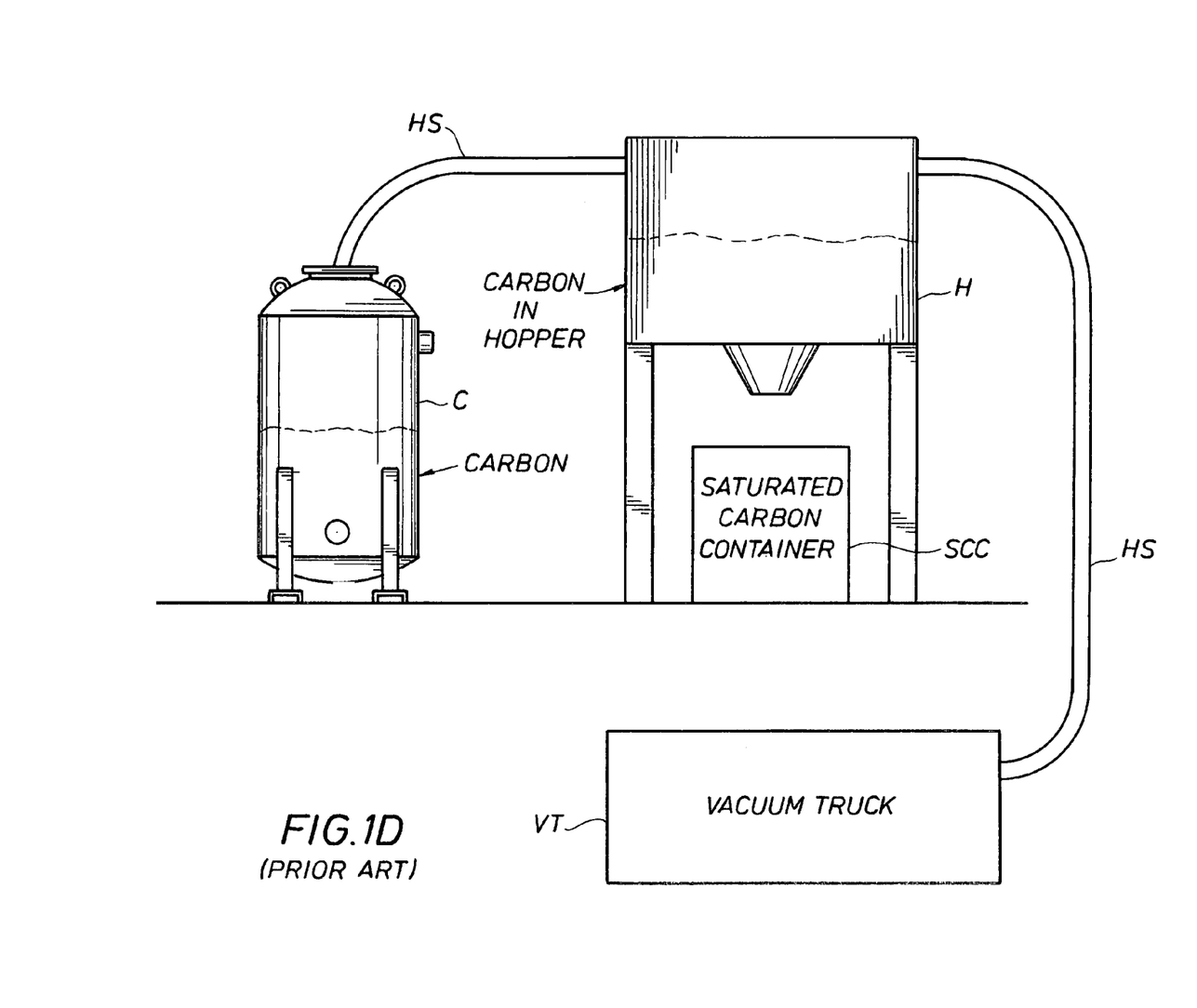

In the prior art, to extract carbon from a canister C, two service people set up a vacuum truck VT and hopper system H. They connect their hoses HS to the vacuum truck and to the hopper system and to each carbon vessel in turn. See FIGS. 1C and D. They vacuum the carbon vessel until it is empty, or until the hopper system is full of saturated carbon and is ready to dump. When the hopper system is full to its capacity, vacuuming is stopped and the saturated carbon is dumped from the hopper into the type of container the customer desires, preferably a roll-off box but possibly a saturated carbon container SCC or bag. It takes significant time to go through this vacuuming and hopper dumping process, and there is a potential that a service person could get injured in the many above steps that occur.

In preferred embodiments the instant invention, described more fully below, proposes to take most of the above steps out of the process. The instant invention may either employ a novel canister or novelly use a standard canister. Basically, the instant invention proposes to lift a canister, such as with the fork lift available, and/or to pivot a canister, in order to situate an operable valve of the canister over a spent carbon container as specified by the customer. The operator then pulls the valve and dumps the spent carbon directly therein. The valve is closed and the canister placed in an up right position and refilled.

The instant system and method saves time, saves money in man hours, saves money in maintaining vacuum trucks, and should save money on injury lawsuits. It is safer, faster and easier.

Furthermore, refineries and chemical plants all expel significant exhaust, and there are times when carbon gets saturated very quickly. With the new system and method one could change out carbon every hour on the hour, if necessary.

Basically, in regard to the canister, any type of bolting system, any type of valve, any type of trim for the valve and any type of lining for the vessel can be used.

The following relates a time difference study conducted to compare the prior art system and the instant invention. This study shows that there are significant and surprising time differences between the vacuuming system and the dumping system for carbon canisters.

For the studies, vessels for both methods were assumed to be located in the same place and position. There were 3000 pounds of carbon to be removed and to be placed into a roll-off box, in segments of three 1000 lb vessels. There was a forklift available for both vacuuming and dumping. The carbon was assumed to be in the same condition in both studies.

The time to remove the lid from the vessels, to fill the vessels, and to replace the lid on the vessels, is the same on both studies. The vacuuming study requires two people; the dumping study requires only one person.

Starting with the vacuuming study, the steps comprise: unstrap the equipment and remove the hopper from the truck with the fork lift. Place the hopper in a position which lines up with the vacuuming valve. Move the vessels to the side of the truck. Use the bed of the truck as a platform in order to be at the correct height for vacuuming. With one person on the truck and one person on the ground, remove the necessary hoses from truck. Connect one hose to the hopper and one hose to the truck. (This process took 19 minutes and 36 seconds.)

Now you are ready to start the vacuuming process. With one person on the truck, who will be vacuuming, and one person on the ground, who will start the P.T.O. and cover the relief valve, the vacuuming process gets under way. (It took 26 minutes and 3 seconds to completely vacuum out 3000 pounds of carbon.) Every time the hopper gets full the personnel must disconnect the vacuuming hoses and empty the hopper. (An additional 10 minutes and 7 seconds is required for disconnection from the hopper.)

Upon completion of the vacuuming, hose tending and equipment loading is required. With one person on the truck and one person on the ground, the hoses are rolled up and handed to be placed on the hose rack. The hopper is then moved and placed onto the truck. All of the equipment is re-strapped. (This process took 16 minutes and 23 seconds.)

The entire vacuuming job, not considering human error or ability or strength or the actual time between these steps, took 1 hour 12 minutes and 9 seconds.

The first step in removing carbon by the novel direct dumping process it is to get on the fork lift, get into position with respect to the first vessel, and lift it off the ground. Drive it over to the roll off box, and place the vessel directly over the roll off box. Engage the parking brake. Get off the fork truck and pull or slide a hand valve to open a lower orifice. When all carbon has escaped the vessel through the lower orifice, pull or slide the hand valve to the closed position. Return and set the vessel back on to the ground. Go to the next vessel in line. This entire process took 12 minutes and 42 seconds. (And the service person can use a standard truck.)

Thus, the vacuuming study took about 1 hour longer to attend to 3000 pounds of spent carbon.

FIGS. 2-16 disclose various specific possible embodiments of the instant invention in detail.

In general in the inventive embodiments, the canisters all work by unbolting a lid at the top and pouring fresh carbon into the top of the vessel. Flanges for connecting process stream lines to nipples on the canister are provided and can be connected and tightened and loosened and unconnected. The process stream line contents are filtered through the carbon in the canister.

The preferred container for spent carbon, wet or dry, is a roll-off box. However, any suitable container for spent carbon can be used. It is known to use saturated carbon containers or bags.

If gravity is insufficient to dump all of the spent carbon from a vessel, vibration, shaking or a squeegee can be employed. This is discussed specifically in certain embodiments.

Figures 2A, 2B, 2C:
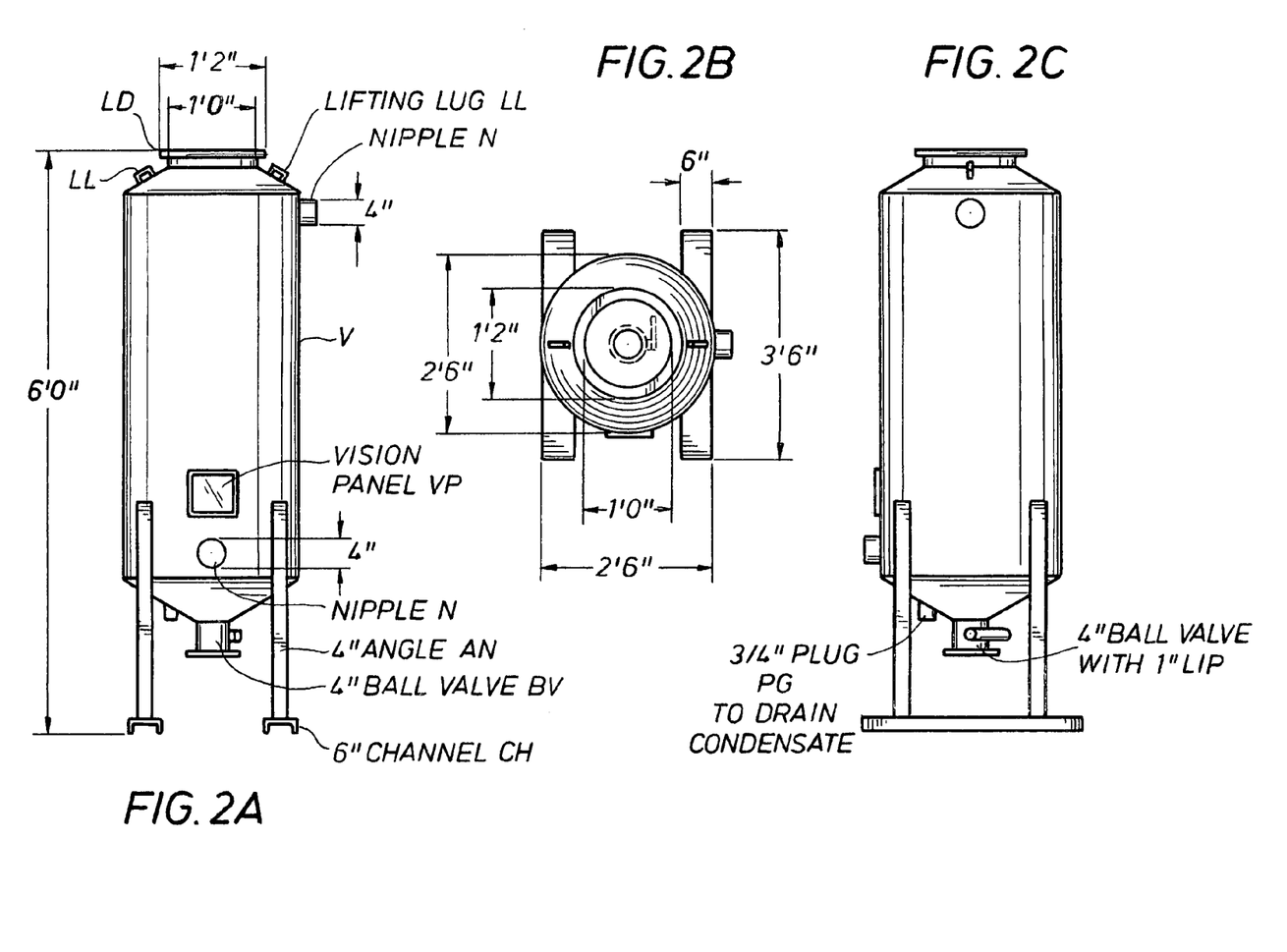
FIGS. 2-16 illustrate various embodiments of the present invention.

The vessel V of FIGS. 2A-C is a six foot model that works by unbolting lid LD and pouring carbon into the top of the vessel. Process stream lines are then connected to flanges and nipples N and the stream is then filtered through the carbon.

When the carbon is saturated, one service person sticks forks F of a fork truck into bottom channels CH or uses a cherry picker on lifting lugs LL and places the vessel V over a container such as a roll out box.

All carbon will flow out the bottom of vessel through ball value BV into the new container. The service person then closes the ball valve, and refills fresh carbon in through the top of the vessel.

The service person can also use the vibration, shaking, or squeegee methods to dislodge any stuck carbon.

Figure 3:
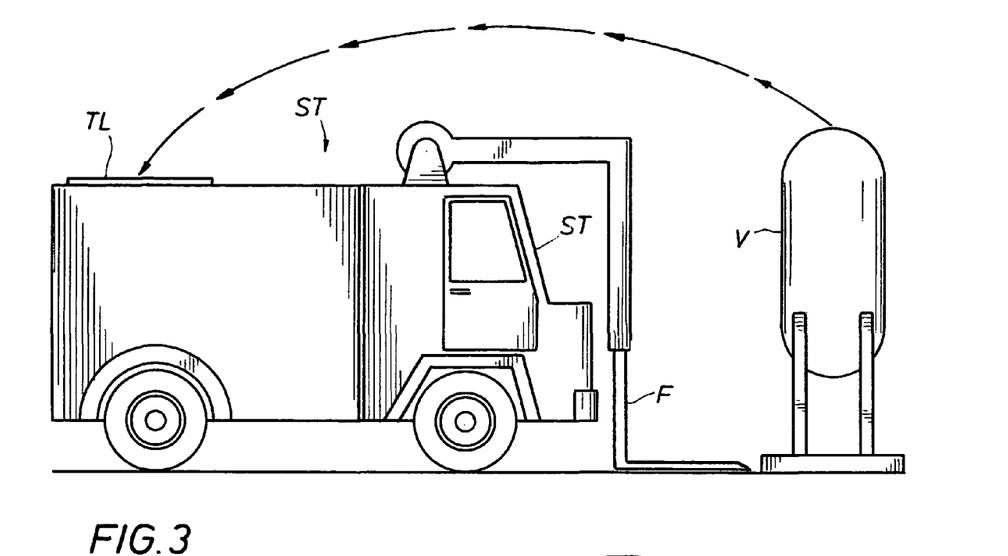

The embodiment of FIG. 3 utilizes a special truck ST, much like a front loading garbage truck. With such embodiment a vessel can be quickly inverted over a truck and dumped using the standard opening on top of the vessel, also without need for a separate fork lift, a second orifice, or a roll-off box. Thus, the opening at the top of the canister provided for adding fresh carbon could be used for dumping the spent carbon. Specifically in FIG. 3 the truck ST uses its forks F to lift the vessel V overhead. The truck box lid TL is rolled open. The valve (not shown) on top of the vessel V is moved to open. All carbon falls into the truck box and the lid is closed. The vessel V is placed into the up-right position and filled with fresh carbon.

Figure 4:
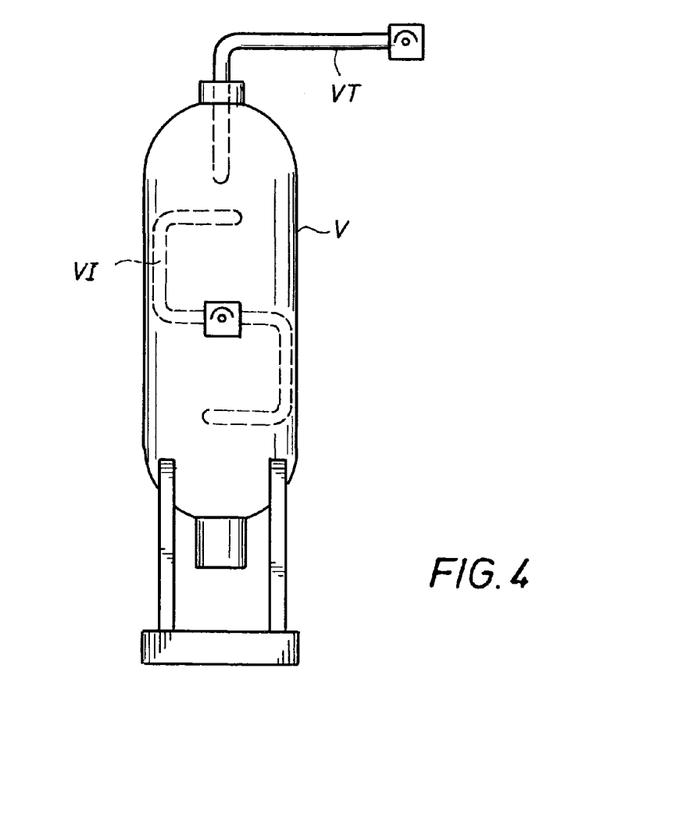

The vibration model in FIG. 4 illustrates use of a vibrating prong, VT such as used with certain cement mixers, inserted inside of a canister. A vibrator VI could also be built into a vessel V. Shaking a vessel by a truck or forklift can also be used to dislodge compacted spent carbon. The preferred agitation method is vibration to remove carbon that has adhered together or to the walls inside of the vessel. In some embodiments pre-installed vibrators VI are activated inside the vessel by a switch in the operators box located on the outside of the vessel. When the switch is activated the vibrators loosen the carbon, and gravity draws the carbon out of the vessel.

A hand held vibrating tool VT is also available that fits easily into the top or bottom of the vessel, and is light enough to carry on a service truck. The shaking or squeegee method may also be used to insure that all carbon is removed.

Figure 5:
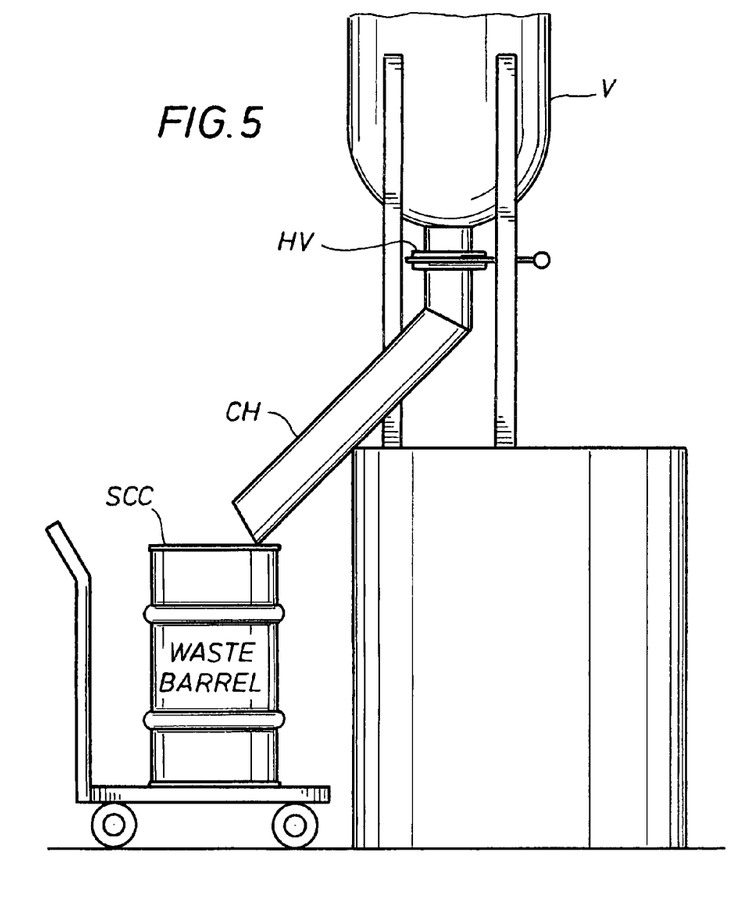

The embodiment of FIG. 5 permits a vessel V to stay in position. A spent carbon container SCC fits under a chute CH which is utilized. In the carbon chute model the vessel V stays fixed in position. Use of this vessel is, as with other vessels, by filling from the top and filtering. When the carbon is saturated, personnel pulls a lower hand slide valve HV to the open position and carbon falls down the chute CH. One may use a proper containers SCC that fit under the chute.

With this vessel model one can also use a vibration or squeegee method, if necessary.

Figure 6:
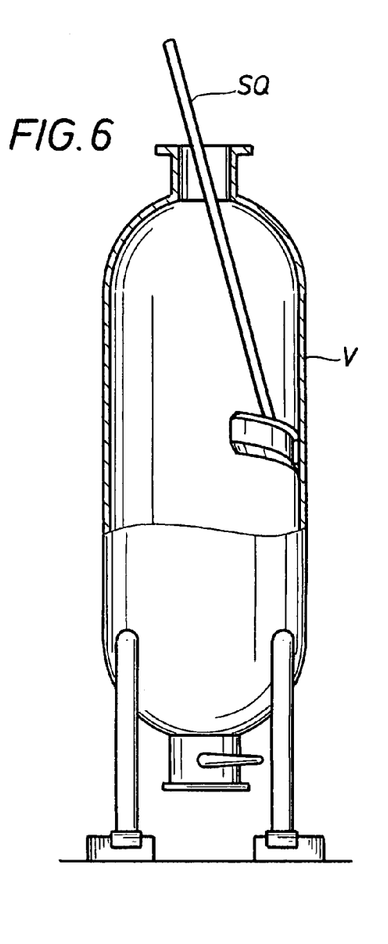

The squeegee method illustrated in FIG. 6 discloses how residual carbon can be scraped free from inside a vessel V. Water can be used with the squeegee SQ. The squeegee method is used to insure that any residual carbon can be scraped free from inside the vessel. Again, one can use water with the squeegee to make it more effective. The squeegee tool is preferably crescent shaped to fit the contour of the vessel.

Figures 7, 8:
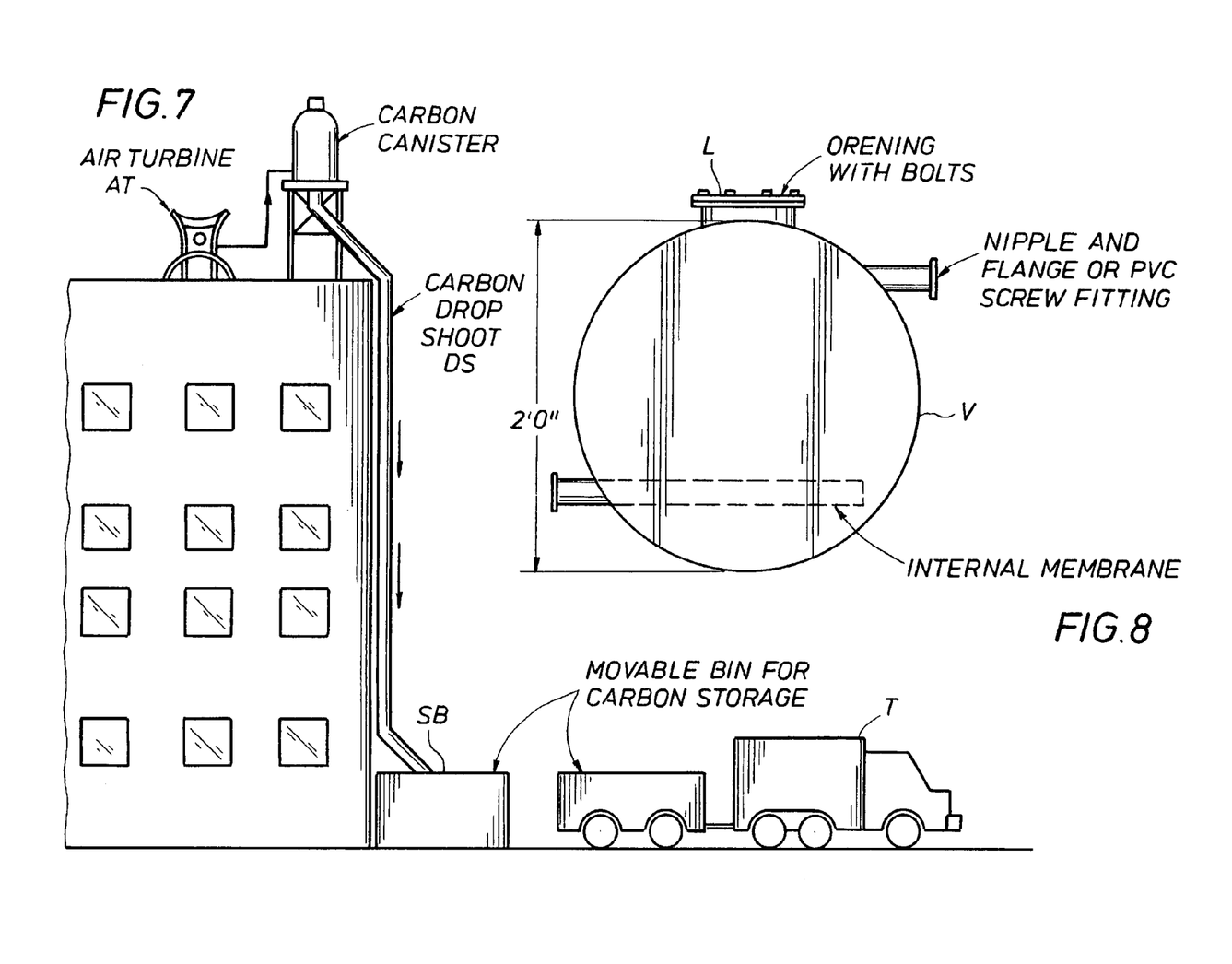

The smog reduction model of FIG. 7 illustrates use of the invention outside of a process plant. The smog reduction model of FIG. 7 is especially effective in high smog areas. During ozone action days, when smog covers the building, an operator can turn on the turbine system AT. A high volume of air will be sucked into the duct work and processed contaminated air will pass through the carbon vessels. Clean air then flows from the outlet.

When the carbon is saturated, an operator pulls a valve and carbon falls out a bottom chute and down though a drop chute DS attached to the building. Saturated carbon is collected in a movable carbon storage box SB. When carbon storage box is full, a truck T picks up the box and brings the spent carbon to a plant for processing.

The circular model of FIG. 8 permits easy inversion of a vessel V in order to dump carbon by means of the upper lid through which fresh carbon is added. To use this circular model an operator must first unbolt the lid L and drop fill the vessel with carbon, into the top of the vessel. The operator replaces the lid L and connects the flanges. When the carbon is saturated an operator removes the carbon by first removing the lid. The operator then rolls or turns upside down the vessel to dump the carbon. This vessel V can also ride on carrier bearings and pivot, making it attractive for residential areas. Use of the vibration, shaking, or squeegee methods can insure that all carbon is removed.

Figure 9A:
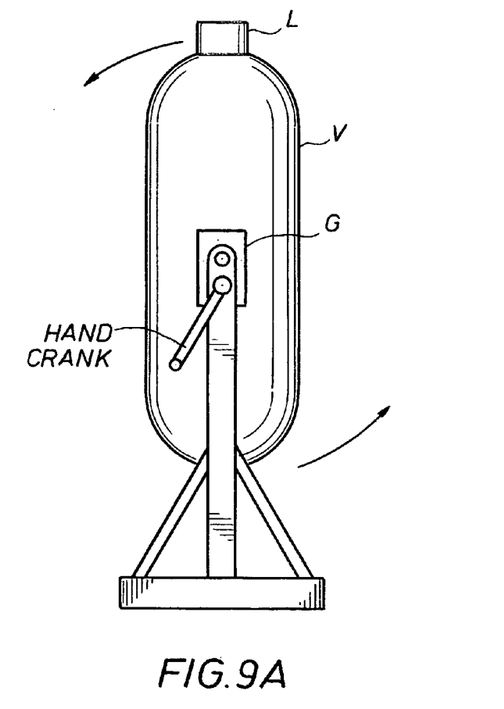
Figure 9B:
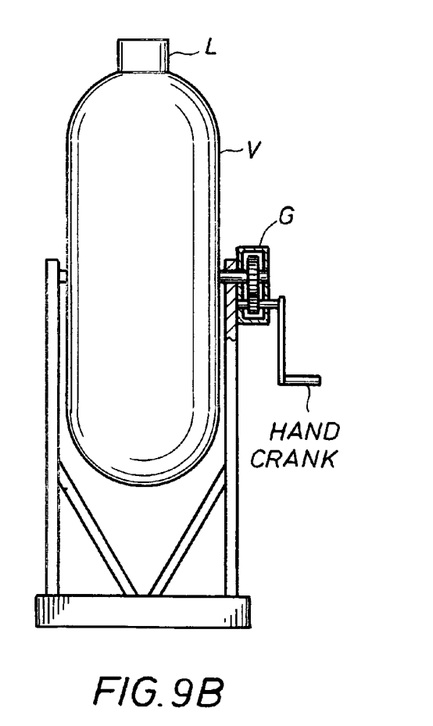
Figure 10:
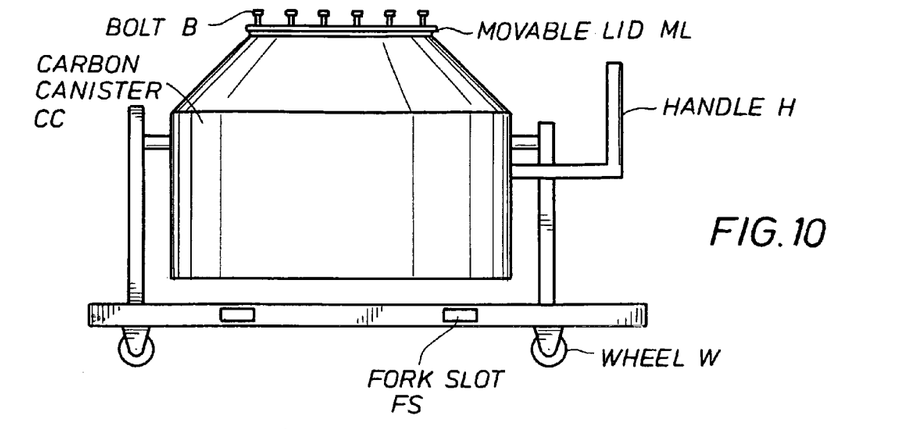

The models of FIGS. 9 and 10 provide gears or levers on the side of the vessel to facilitate tilting the vessel for the carbon to dump out of the top. To use the pivot vessel model of FIG. 9 an operator unbolts the lid, and fills the vessel V with carbon. The operator thus rebolts the lid, connects the hoses to flanges and starts filtering. The operator removes contaminated carbon by first removing all connections and removing the lid. The operator positions the vessel and frame over a container that is suitable for contaminated carbon. Using the gears or levers G on the side of the vessel, the operator tilts the vessel over until carbon pours out the top. The mechanism that turns the canister can be a chain pulley, manual gear box, or a gear box with a motor, gas or electric, hydraulic, or air driven. The actual vessel rides and sits on carrier bearings.

To insure that all carbon is removed, the operator may use the vibration, shaking or squeegee methods.

For use of the concrete mixer model of FIG. 10 the operator first unbolts the lid. Then the operator drop fills the vessel with carbon into the top of the vessel. The operator replaces the lid and connects to flanges. When the carbon is saturated, the operator removes the carbon by first removing the lid. The operator then pulls the handle to rotate the canister and dump carbon out of the top of the vessel into a suitable container. The operator then places its vessel to the upright position and refills from the top. Wheels and fork channels provide easy accessibility. The operator may use the vibration, shaking or squeegee methods to insure that all carbon is removed.

Figure 11:
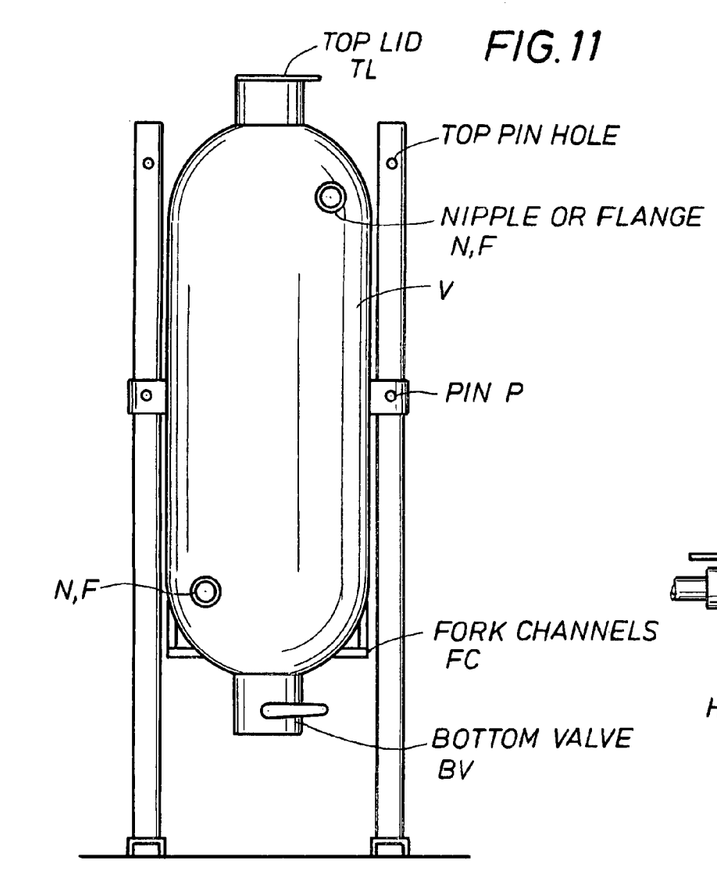

The vessel of FIG. 11 is modeled on a concrete mixer, with pivoting structure. This bi-level model vessel V works by unbolting the top lid TL and pouring carbon into the top of the vessel V. A process structure line is connected to the flanges and nipples and the stream is then filtered down through the carbon.

When the carbon is saturated, the operator stick forks of a fork truck into the bottom form channels CH. The operator pulls pins P on the side and lifts the vessel with a fork truck, placing it at a higher level. The operator places a bag or drum under the vessel, and turns the bottom valve BV. All carbon will flow out the bottom of vessel into new container. The operator closes the valves and refills through the top of the vessel. The operator can also use the vibration, shaking, or squeegee methods.

Figure 12:
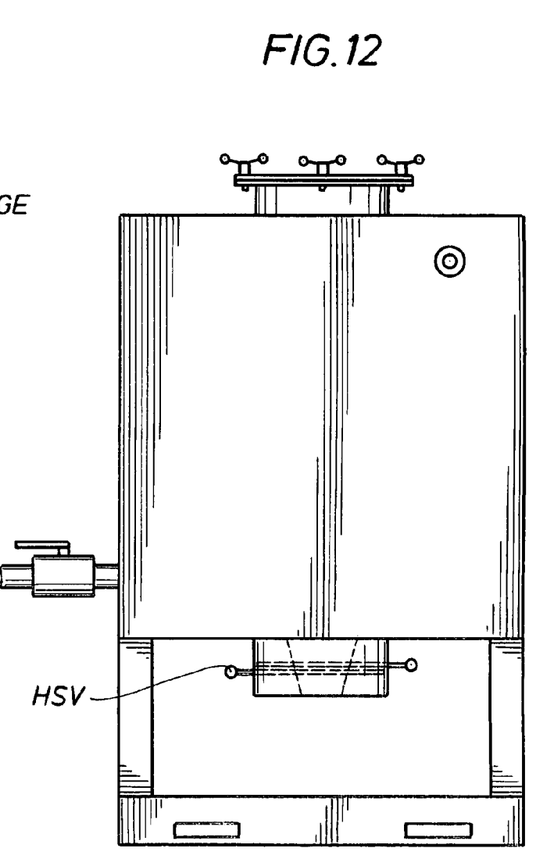

The embodiment of FIG. 12 shows a vessel that lifts out of its frame by means of a pin. To operate the flow bend model vessel, the operator removes the lid and pours carbon into the vessel. The operator connects to the flanges and starts filtering. To remove saturated carbon the operator uses hand slide valve HSV. The operator moves the vessel over a larger carbon container. Then the operator pulls the hand slide valve to open. When carbon is completely removed from the vessel, the operator pushes the hand slide valve to close, and refills.

The operator may use the vibration, shaking, or, squeegee methods to insure complete evacuation of carbon.

Figures 13, 14B:
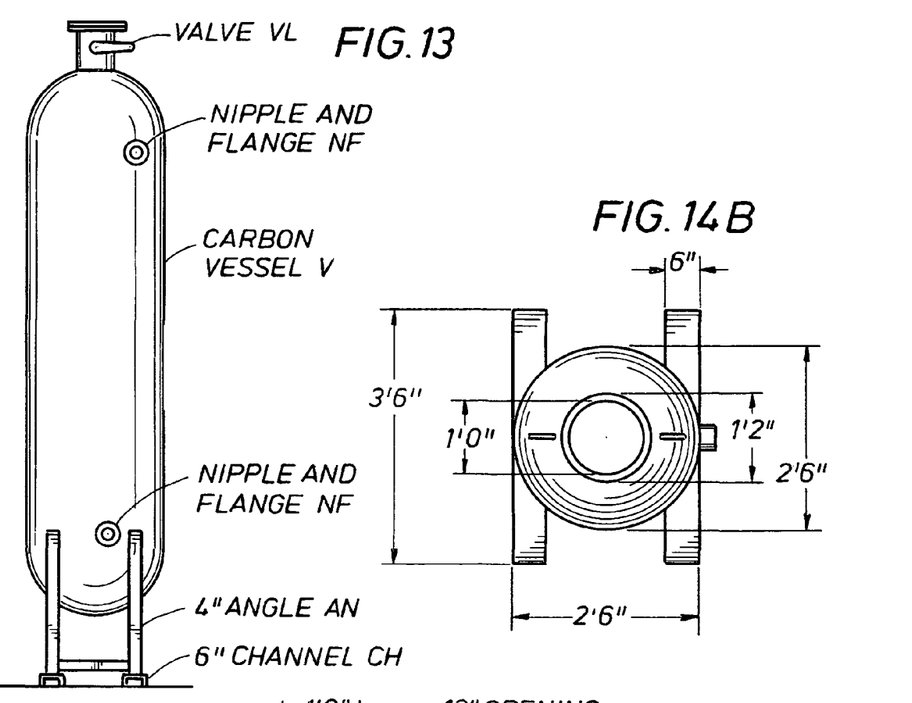

The embodiment of FIG. 13 is moved over a larger carbon container where a hand lever is pulled to open a valve. To use this vessel the operator must first open the valve at top and pour carbon into the top of vessel V. The operator connects the nipples NF at top and bottom and begins filtering. To change out carbon, the operator disconnects the flanges, and uses a truck to lift the vessel over the truck and pour carbon into and over a back compartment, turning valve VL open. When finished, the operator puts forks of the fork truck to the down position and uses sacks to pour carbon into the top of the vessel. It is best to use the shaking method to insure that all carbon falls out, but the operator can also use the vibration and/or squeegee methods.

Figure 14A:
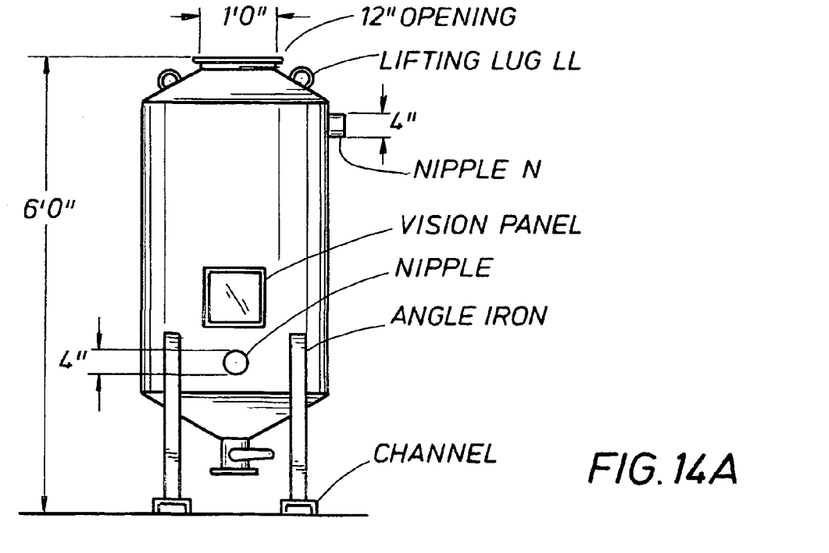

The canister or vessel design of FIGS. 14A and 14B delineates more specifically a preferred embodiment for a novel canister. The vessel is a 6-foot vessel having an opening on top and a 4-inch ball valve opening on the bottom. The vessel is structured to hold approximately 500 pounds of carbon and is structured of carbon steel. A vision panel exists in the side of the vessel.

Figure 15:
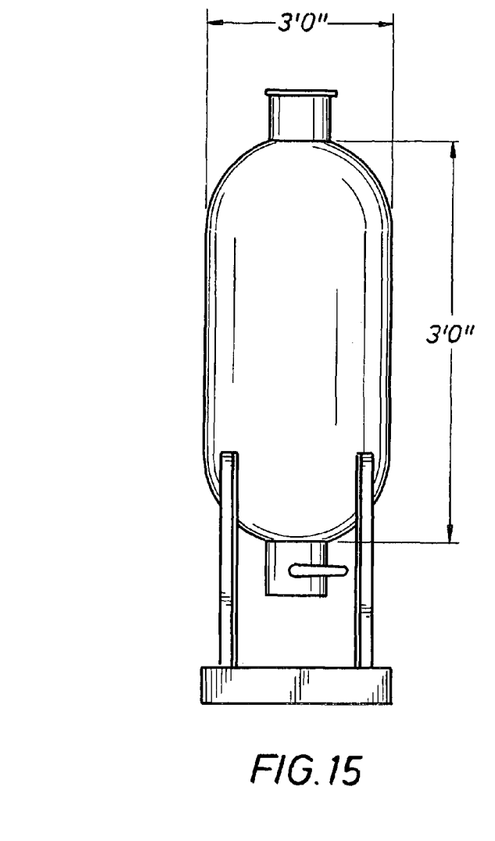

The embodiment of FIG. 15 reflects a shorter 3-foot model that has a longer diameter than the prior 6-foot model. Such canister may give greater stability and better footing. This model is shorter, has a bigger diameter, and its best use is for stability and better footing. Sometimes the level of the ground is at an incline which can make the canister top heavy. With the vessel closer to the ground it becomes more stable.

Figure 16A:
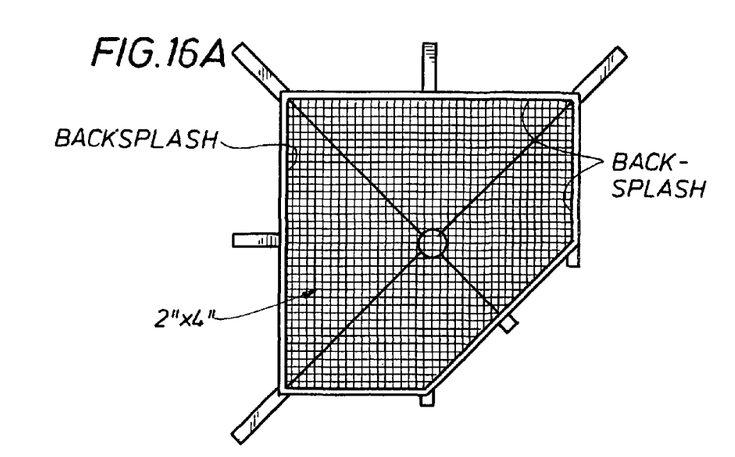
Figure 16B:
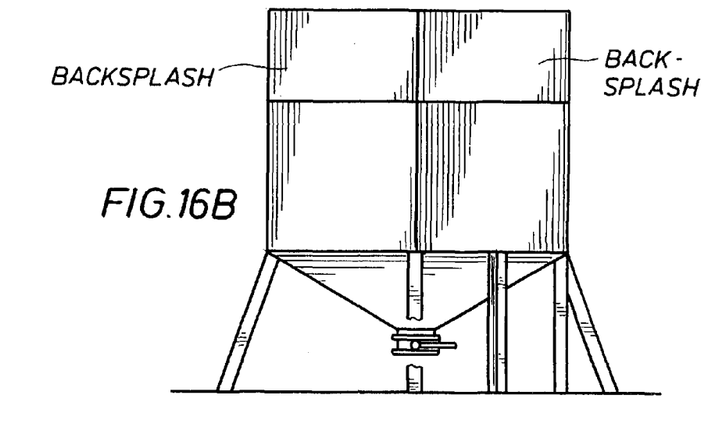

The embodiment of FIG. 16 illustrates re-bagging a decaying bag. This model is used to rebag carbon from a decaying bag. Sometimes the bags that are used to store saturated carbon become brittle and tear apart, and carbon falls all over the ground. With this model you can lift a bag up on a pallet (upon which the bags are always placed) and tilt the fork truck forward. The bag will fall into the vessel. There will be a grating inside to bust the bag. The carbon will fall through the grating and down into the cone. Once into the cone, the operator uses the valve to start and stop flow. The operator can rebag the carbon or place into a roll off box. There will preferably be a backsplash to prevent carbon from falling out of the vessel and eight legs to help with stability. Five legs will preferably be at an angle for stability to prevent the vessel from falling over. The three in front of vessel will preferably be straight to allow a fork truck to move close to the vessel.

The foregoing description of preferred embodiments of the invention is presented for purposes of illustration and description, and is not intended to be exhaustive or to limit the invention to the precise form or embodiment disclosed. The description was selected to best explain the principles of the invention and their practical application to enable others skilled in the art to best utilize the invention in various embodiments. Various modifications as are best suited to the particular use are contemplated. It is intended that the scope of the invention is not to be limited by the specification, but to be defined by the claims set forth below. Since the foregoing disclosure and description of the invention are illustrative and explanatory thereof, various changes in the size, shape, and materials, as well as in the details of the illustrated device may be made without departing from the spirit of the invention. The invention is claimed using terminology that depends upon a historic presumption that recitation of a single element covers one or more, and recitation of two elements covers two or more, and the like. Also, the drawings and illustration herein have not necessarily been produced to scale.

What is claimed is:

1. An improved method for refreshing carbon in a vessel of a carbon filter system, the system having a process stream line connected to a process stream inlet of the vessel and the vessel having a stream outlet, the system for filtering a process stream until the carbon is spent, the improved method comprising:

servicing a vessel structured to hold 50 to 2000 pounds of carbon filter material and having at least one valved opening, the vessel containing carbon for filtering the process stream, the servicing including inverting the vessel and dumping spent carbon in the vessel through the at least one opening by force of gravity into a spent carbon container below.

2. An improved method for refreshing carbon in a vessel of a carbon filter system, the system having a process stream line connected to a process stream inlet of the vessel and the vessel having a stream outlet, the system for filtering a process stream until the carbon is spent, the improved method comprising:

servicing a vessel structured to hold 50 to 2000 pounds of carbon filter material and having at least one valved opening, the vessel containing carbon for filtering the process stream, the servicing including lifting the vessel and dumping spent carbon in the vessel through the at least one opening by force of gravity into a spent carbon container below.

3. The method of claim 2, comprising:

dumping the spent carbon from a lower valved orifice of the vessel; and lifting the vessel with lifting equipment mating with the vessel for positioning the lower orifice over the spent carbon container.

4. The method of claim 2 that includes a vessel having a lower valved orifice at the bottom of the vessel.

5. The method of claim 2 wherein the lifting includes lifting with a forklift.

6. The method of claim 1 or 2 wherein the spent carbon container includes a roll-off box.

7. The method of claim 3 that includes shaking the vessel with the lifting equipment while positioned over the spent carbon container.

8. The method of claims 1 or 2 that includes scraping inside walls of the vessel.

9. The method of claim 1 or 3 that includes vibrating the vessel.

10. The method of claim 9 that includes vibrating the vessel with vibrating equipment including a vibrating prong inserted inside the vessel.

11. The method of claim 1 or 2 wherein the vessel is structured to hold 50 to 1000 pounds of carbon filter material.

12. The method of claim 1 or 2 wherein the vessel is structured to hold 50 to 500 pounds of carbon filter material.

13. A carbon filter vessel, comprising:
   a vessel structured to hold 50 to 2000 pounds of carbon filter material;
   the vessel having an inlet and an outlet for placing the vessel in fluid communication with a process stream to be filtered;
   the vessel having an upper orifice capable of opening and closing for adding fresh carbon filter material; and
   the vessel having a frame element structured for pivoting the vessel to invert the vessel.

14. The vessel of claim 13 wherein the vessel is structured to hold 50 to 1000 pounds of carbon filter material.

* * * * *